UNITED STATES PATENT OFFICE.

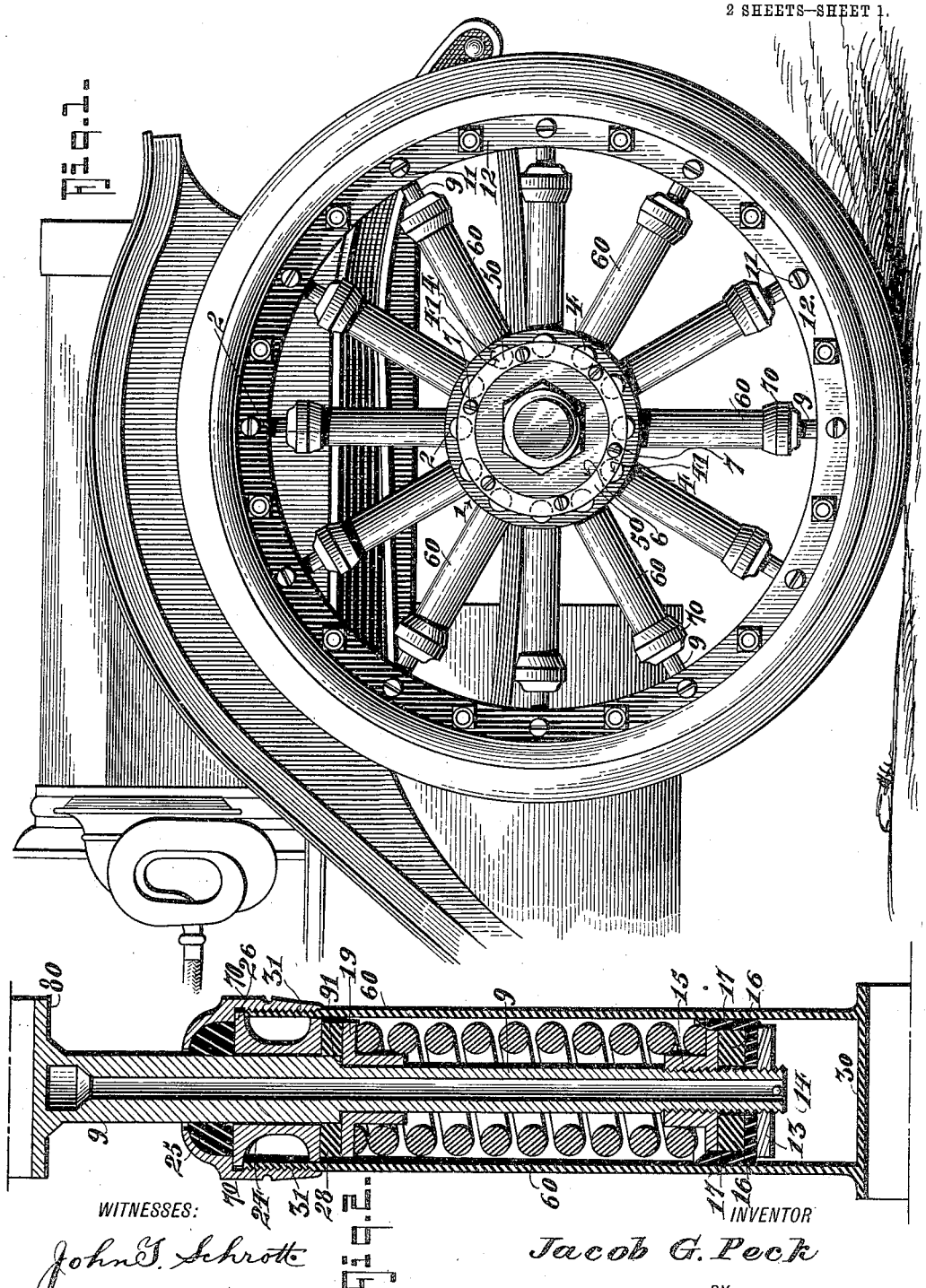

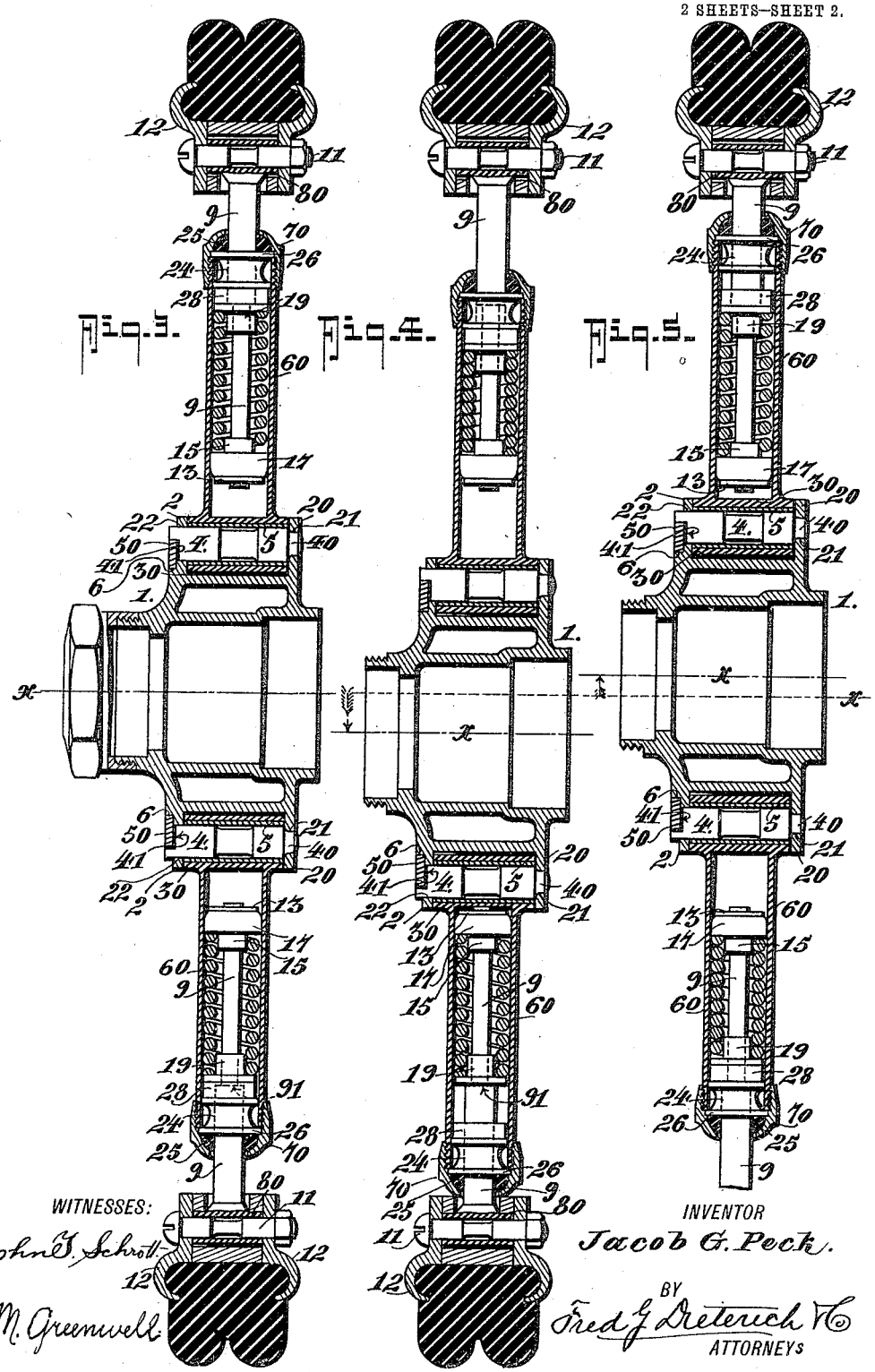

JACOB G. PECK, OF PORTLAND, OREGON, ASSIGNOR TO H. O. PECK AUTOMOBILE WHEEL CO., INCORPORATED, OF PORTLAND, OREGON.

RESILIENT WHEEL.

1,069,807. Specification of Letters Patent. Patented Aug. 12, 1913.

Application filed November 27, 1911. Serial No. 662,659.

*To all whom it may concern:*

Be it known that I, JACOB G. PECK, residing at Portland, in the county of Multnomah and State of Oregon, have invented a new and Improved Resilient Wheel, of which the following is a specification.

This invention, which relates to vehicle wheels and more particularly to that type of wheels having cushioning means therefor, primarily has for its object to provide a practical solid tire wheel, especially adapted for automobiles, that can be economically manufactured and with the component parts coöperatively so arranged that the cost for assembling wheels of the type stated is materially lessened from that now required in the make-up of spring spoke resilient wheels.

Another object of my invention is to provide a simplified and improved wheel structure, in which each spoke is a unit cushioning means and the said means so designed whereby under ordinary standing or riding of the machine the wheels are held with their rims concentric to the axis, said cushioning means being arranged for so taking up the load that each wheel is properly centered and the strain uniformly sustained upon each axle bearing.

Another and important object of this invention is the provision of an improved construction and arrangement of a wheel structure, whereby, in stopping or starting the motor, the latter is relieved of vibration and the strain usually transmitted to the crank shaft and the differential is uniformly distributed and entirely taken up by the wheels.

Again my invention has for its object to provide an improved motor wheel in which the cushioning elements can be conveniently and quickly adjusted to set the wheel to suit the particular driving mechanism coöperating therewith, and in such a manner that draggage or stopping when hill climbing, as also danger of breaking the crank shaft and tearing or stopping the differential, is overcome.

A still further object of my invention is to provide an improved wheel construction in which each spoke is a unit, which is set to its required resiliency or cushioning condition, and in which the cushioning means if primarily adjusted to the desired load carrying capacity before the said means is placed in coöperative connection with the spoke proper, the rim, and the hub, and which is capable of being readily removed in case of breakage or repair without disorganizing the remaining spokes.

With other objects in view that will hereinafter appear my present invention comprises a resilient wheel that embodies the general and specific construction and arrangement of the parts that constitute the complete wheel, hereinafter explained, specifically pointed out in the appended claims and illustrated in the accompanying drawings, in which:

Figure 1, is a side elevation of my improved wheel, the parts being at their normal position. Fig. 2, is a vertical section of the same, taken on the line 2—2 on Fig. 1. Fig. 3 is a vertical cross section of the wheel showing the parts in their normal position. Fig. 4 is a view similar to Fig. 3 that shows the position of the parts at approximately maximum shifting position when the wheel meets with an obstruction. Fig. 5 is a similar view that illustrates an approximate shift of the parts on a rebound of the wheel.

In the practical arrangement the wheel hub 1 is formed with a series of radially projected sets of ears 2, 20, one set for each spoke between which the tubular inner head or cross member 30 of the spoke is hingedly mounted, the connection therefor being a bolt 4, one end of which has an offset 40 to seat in an aperture 21 in one of the ears 20 and the other projected through the aperture 22 in the other one, 2, of the set of ears, a bushing 5 being preferably held on the bolt 4 for engaging the cross member 30 of the spoke.

Any suitable means may be provided for holding the pivot bolts 4 in place, but on the score of economy I use a ring 50 that fits in the seats 41 formed in the heads of the bolts 4, an adjacent annular recess 6 on the hub 1, the ring being held fast by the lag screws 7, see Fig. 1.

Since all the spokes of the wheel are constructed and operate alike, a detailed description of one will be sufficient. Each spoke comprises a tubular casing or cylinder 60 integral with the cross member 30, and of suitable length, its upper end being externally threaded as at 31 for receiving the cap nut 70 presently again referred to.

The telescopic or resilient spoke section, in my present construction, comprises a coiled spring of powerful tension that surrounds a piston-like rod 9 that is made tubular to lighten the weight thereof and has its upper end formed with a tubular cross head 80 for receiving the pivot bolt 11 that passes through the opposite tire clenching rims 12—12. The lower end of the rod 9 is threaded to receive a washer 13, held from working off by a cross pin 14 and an adjustable stop plate 15 that forms the lower bearing for the spring.

16 designates a washer, preferably fiber, and 17 a rubber or leather washer for engaging and closing off the tubing, the said washers 16 and 17 being clamped between the stop plate 15 and the washer 13.

19 designates an outer stop plate that is slidably mounted on the rod and it forms the upper bearing for the spring, and the said plate 19 is always held in solid contact with the shouldered position 91 of the rod 9.

24 designates a filler block mounted on the upper and enlarged end of the rod 9 for closing off the upper end of the tubular spoke member and 25 denotes an elastic washer in the top of the cap 70 that bears on the filler block 24.

By reason of the peculiar construction and novel arrangement of the parts shown and described, I have provided a stable and easily assembled wheel structure that can be economically made, since in the assembling of the parts the resilient telescopic sections of the spokes can be quickly mounted within the tubular sections and positively held to their operative positions by simply turning the caps 70 home by hand, thus avoiding the use of the lever power, common in other wheels of the same type, this advantage being apparent when it is mentioned that in other like types of wheels it has required two persons about two hours to assemble one wheel, whereas a boy can assemble one of my wheels in one hour.

Another and advantageous feature of my invention is, that since all of the springs are of a selected initial tension,—according to the normal load of the machine on the axles, it follows that an initial tension of the spring sufficient for supporting the normal load appears so soon as the spokes are assembled, and as each spoke of the wheel is tensioned to sustain its share of the normal load, it follows that under ordinary conditions the wheels run substantially concentric with the axle.

By referring to Figs. 2, 3 and 4, it will be apparent that under the normal conditions, the load on the axles is carried by the upper ones of the spokes only, the lower spokes and wheel portions being entirely free from the load strain, as the strain is through the hub, the uppermost spoke tubes, through cap 70, and the filler block on the slidable collar or member 19 whence the load is transmitted to the spring that is now hung on its rod from the top rim section of the wheel.

Under the normal conditions, the parts will, during running, retain a relatively fixed relation, as in Fig. 3, and thereby be held from rattling or loose play. Now in passing over a rut or hollow in the roadway the wheel hub will drop below the true axial center, see line $x$, Fig. 4, and in doing so, the tubular portions of the lower spokes will correspondingly slide down over their springs and their pistons, the upper springs being relatively compressed by the jar or wheel shock passing the obstruction, it being understood that under the conditions last stated the upper springs carry the load and take up the shock, it being also apparent from the drawings, that the connection of the springs with their plunger head and shoulder bearing never separate or have loose play, the tension of the spring being such that the only loose member, the stop plate 19, is always firmly held seated on the shoulder of the piston rod, such arrangement of parts being very advantageous as it positively prevents rattling and knocking of the parts during the rebounds of the wheel, as well as the danger of the breakage of the parts.

As before stated, the upper spokes carry the load and take up jars and shocks in striking bad road places, the bottom spokes normally being free from load strain. It should be mentioned, however, that on the rebound of the wheel the bottom springs form the cushions for absorbing the shocks and jars and that will be understood by referring to Fig. 5 of the drawings in which the hub is shown as having gone up above the normal axial line $x$, thereby causing a pull against and consequent compression of the lower spring, the compression being greatest on the central spoke and relatively decreasing on the adjacent lower spokes.

For holding the filler block in a fixed position when the plate 19 separates therefrom, the said filler block has a flange 26 that rests on the outer edge of the cylinder and is clamped down by the cap 70, see Fig. 2, which also shows a washer 28 between the filler block and the stop plate 19, but this may be omitted and the filler block made of sufficient length to fill the space on the cylinder beyond the plate 19.

What I claim is:—

1. In a vehicle wheel; a hub having sets of radial ears, spoke sections each having a tubular cross head for fitting between their respective sets of hub ears, a spoke section pivotally connected to the wheel rim that telescopically connects with the other spoke section, a cushioning device that coöperates with the spoke sections, a pintle for each spoke cross head having a stepped connection with one of the hub ears of its corresponding set, a head portion that projects through the other ear of the said set, and a single member detachably mountable on the hub for locking all of the pintles in their operative position.

2. In a resilient vehicle wheel, a spoke comprising a cylinder, a piston rod that projects into the cylinder, a piston carried by the said rod, an apertured nut cap for closing the end of the cylinder, a member slidable on the rod, a spring having an initial tension mounted on the rod between the piston and the sliding member, means on the rod for holding the sliding member from movement in one direction beyond its initially set position and for holding the piston head, the sliding plate and the spring from separation during the expansive changes in the spring and a fiber washer between said sliding plate and said cylinder end closing member.

JACOB G. PECK.

Witnesses:
W. E. BYERS,
L. A. MAIERHOFER.

Copies of this patent may be obtained for five cents each, by addressing the "Commissioner of Patents, Washington, D. C."